(12) United States Patent
Goeringer et al.

(10) Patent No.: US 11,726,813 B2
(45) Date of Patent: Aug. 15, 2023

(54) SYSTEMS AND METHODS FOR ESTABLISHING SCALABLE CREDENTIAL CREATION AND ACCESS

(71) Applicant: CABLE TELEVISION LABORATORIES, INC, Louisville, CO (US)

(72) Inventors: Steven J. Goeringer, Westminster, CO (US); Igor Faynberg, East Brunswick, NJ (US); Massimiliano Pala, Denver, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 531 days.

(21) Appl. No.: 16/052,392

(22) Filed: Aug. 1, 2018

(65) Prior Publication Data

US 2019/0042302 A1    Feb. 7, 2019

Related U.S. Application Data

(60) Provisional application No. 62/697,805, filed on Jul. 13, 2018, provisional application No. 62/539,847, filed on Aug. 1, 2017.

(51) Int. Cl.
*G06F 9/48*        (2006.01)
*G06F 9/455*     (2018.01)
(Continued)

(52) U.S. Cl.
CPC ........ *G06F 9/4875* (2013.01); *G06F 9/45558* (2013.01); *G06F 21/57* (2013.01);
(Continued)

(58) Field of Classification Search
CPC .. G06F 21/57; G06F 2009/4557; G06F 21/53; G06F 21/00; G06F 9/4875; G06F 2221/2143; G06F 2009/45583; G06F 21/602; G06F 2009/45562; G06F 21/606; G06F 3/0647; G06F 9/45558;
(Continued)

(56) References Cited

U.S. PATENT DOCUMENTS 8,694,781 B1 *   4/2014   Griffin .................. G06F 21/566
                                                                              713/168
8,799,898 B2 *   8/2014   Davis ...................... G06F 9/468
                                                                                 718/1
(Continued)

*Primary Examiner* — Lizbeth Torres-Diaz
(74) *Attorney, Agent, or Firm* — Josh C. Snider

(57) ABSTRACT

A client access network includes a cluster of servers. The cluster of servers includes a boot node, an administrator node, a computing node, and a storage node. The client access network further includes a plurality of segregated subnetworks. The plurality of segregated subnetworks includes a boot subnetwork, an administration subnetwork, a public subnetwork, and a private subnetwork. The client access network further includes at least one hardware security module, a dedicated subnet in operable communication with the at least one hardware security module and each of the plurality of segregated subnetworks, and a router in operable communication with the at least one hardware security module and each of the cluster of servers. The router is further configured to route traffic among the plurality of segregated subnetworks and the dedicated subnet.

14 Claims, 6 Drawing Sheets

(51) Int. Cl.
  *G06F 21/57* (2013.01)
  *G06F 21/60* (2013.01)
  *G06F 21/74* (2013.01)
  *H04L 12/46* (2006.01)

(52) U.S. Cl.
  CPC ............ *G06F 21/606* (2013.01); *G06F 21/74* (2013.01); *H04L 12/4641* (2013.01); *G06F 2009/4557* (2013.01); *G06F 2221/2143* (2013.01)

(58) Field of Classification Search
  CPC ........... G06F 21/74; G06F 2009/45587; G06F 11/1484; H04L 9/0897; H04L 67/34; H04L 12/4641
  See application file for complete search history.

(56) References Cited

U.S. PATENT DOCUMENTS

| | | | |
|---|---|---|---|
| 10,313,123 B1* | 6/2019 | Grubin | H04L 9/0838 |
| 10,467,049 B2* | 11/2019 | Tarasuk-Levin | G06F 9/45558 |
| 2003/0108204 A1* | 6/2003 | Audebert | H04L 9/0891 |
| | | | 380/277 |
| 2006/0053302 A1* | 3/2006 | Yasaki | H04L 9/0897 |
| | | | 713/176 |
| 2007/0300069 A1* | 12/2007 | Rozas | G06F 21/57 |
| | | | 713/176 |
| 2012/0089831 A1* | 4/2012 | Rozas | G06F 21/57 |
| | | | 713/155 |
| 2013/0132944 A1* | 5/2013 | Davis | G06F 9/468 |
| | | | 718/1 |
| 2014/0040888 A1* | 2/2014 | Bookman | G06F 9/46 |
| | | | 718/1 |
| 2014/0208111 A1* | 7/2014 | Brandwine | H04L 9/0844 |
| | | | 713/171 |
| 2014/0325515 A1* | 10/2014 | Salmela | G06F 9/45533 |
| | | | 718/1 |
| 2015/0355924 A1* | 12/2015 | Holla | G06F 9/45558 |
| | | | 718/1 |
| 2015/0358161 A1* | 12/2015 | Kancharla | H04L 9/3234 |
| | | | 713/164 |
| 2016/0357988 A1* | 12/2016 | Ferguson | G06F 9/45558 |
| 2017/0359414 A1* | 12/2017 | Sengupta | G06F 9/45558 |
| 2018/0095997 A1* | 4/2018 | Beveridge | H04L 47/70 |
| 2018/0373879 A1* | 12/2018 | Lango | H04L 63/0428 |
| 2019/0026467 A1* | 1/2019 | Suryanarayana | G06F 21/57 |
| 2019/0042302 A1* | 2/2019 | Goeringer | G06F 21/57 |
| 2019/0179558 A1* | 6/2019 | Van Riel | G06F 3/0673 |
| 2019/0286476 A1* | 9/2019 | Franciosi | G06F 3/067 |
| 2020/0097315 A1* | 3/2020 | Faynberg | H04L 9/3263 |
| 2020/0389522 A1* | 12/2020 | Cherivirala | G06F 9/45558 |
| 2021/0342232 A1* | 11/2021 | Gopalan | G06F 11/1451 |
| 2023/0066427 A1* | 3/2023 | Aigner | G06F 21/53 |

\* cited by examiner

SYSTEMS AND METHODS FOR ESTABLISHING SCALABLE CREDENTIAL CREATION AND ACCESS

CROSS REFERENCE TO RELATED APPLICATIONS

This application claims the benefit of and priority to U.S. Provisional Patent Application Ser. No. 62/539,847, filed Aug. 1, 2017, and to U.S. Provisional Patent Application Ser. No. 62/697,805, filed Jul. 13, 2018, both of which are incorporated herein by reference in their entireties.

BACKGROUND

The field of the disclosure relates generally to management of computer networks, and more particularly, to credential creation and access within such networks.

At present, the rapidly-growing complexity of Network Function Virtualization (NFV), particularly within the context of the Internet of Things (IoT), requires an infrastructure scaled to the demand for availability. Conventional NFV infrastructures often employ hardware roots of trust that aim to establish a tamper-resistant "black box" that use built-in cryptographic keys to perform cryptographic operations, such as encryption, decryption, and hashing. Examples of such hardware roots of trust include the Trusted Platform Module (TPM) and the Hardware Security Module (HSM). These trust models/schemes are used for remote attestation, with the attestation being typically performed by a third party and/or a Cloud services user.

Conventional HSMs typically include a physical computing device that safeguards and manages digital keys for authentication and providing cryptoprocessing. Because conventional HSMs often form critical portions of a public key infrastructure (PKI), or other similarly critical applications, the HSMs are frequently clustered to enhance availability and performance. Specifically, in IoT applications, the dynamic nature of the IoT Cloud generally requires that the specific modules/HSMs that perform large cryptographic transactions are located in geographic proximity (i.e., clustered) to the virtual machines (VMs) that use these modules. However, conventional HSM implementations have been unable to sufficiently network separate HSMs together in a scalable manner for the Cloud.

More particularly, even though the use of HSM devices (e.g., SafeNet Luna Network HSM 7, etc.) was initially recommended by the National Institute of Standards and Technology (NIST), HSMs are presently known to "not scale well to the cloud paradigm." Nevertheless, emerging NFV security standards from the European Telecommunications Standards Institute (ETSI) continue to endorse the use of HSM as the technology of choice for addressing problems due to hypervisor introspection. HSMs, for example, provide a tamper resistant, and in some cases a tamper proof, platform to hold confidential cryptographic information, as well as the performance of cryptographic functions. That is, tampering may occur as a matter of degree: (i) "tamper proof;" (ii) "tamper resistant;" and (iii) "tamper aware." Accordingly, different threat models may require all copies of a key to be deleted if a given HSM is compromised, or has been subjected to an attempted compromise.

Consensus mechanisms on key "health" and HSM network state relate to tampering degrees, and HSMs may be configured such that unauthorized access to the HSM, whether logically or physically, may trigger alarms and/or result in permanent destruction of keys stored on or in the HSM, while also harming the functionality performed by the HSM. Accordingly, it is desirable to provide systems and methods for networking HSMs in a scalable manner.

BRIEF SUMMARY

In an embodiment, a client access network includes a cluster of servers. The cluster of servers includes a boot node, an administrator node, a computing node, and a storage node. The client access network further includes a plurality of segregated subnetworks. The plurality of segregated subnetworks includes a boot subnetwork, an administration subnetwork, a public subnetwork, and a private subnetwork. The client access network further includes at least one hardware security module, a dedicated subnet in operable communication with the at least one hardware security module and each of the plurality of segregated subnetworks, and a router in operable communication with the at least one hardware security module and each of the cluster of servers. The router is further configured to route traffic among the plurality of segregated subnetworks and the dedicated subnet.

In an embodiment, a method of transferring security data from a first hardware security module (HSM) of a computer network to a second HSM is provided. The method includes a step of determining an association of a virtual machine (VM) with the first HSM. The VM runs on a first host within the computer network. The method further includes steps of triggering a migration operation of the VM at the first host, transferring the security data from the first HSM to the second HSM, initiating the migration operation of the VM concurrently with the step of transferring, and updating the migration status of the VM.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
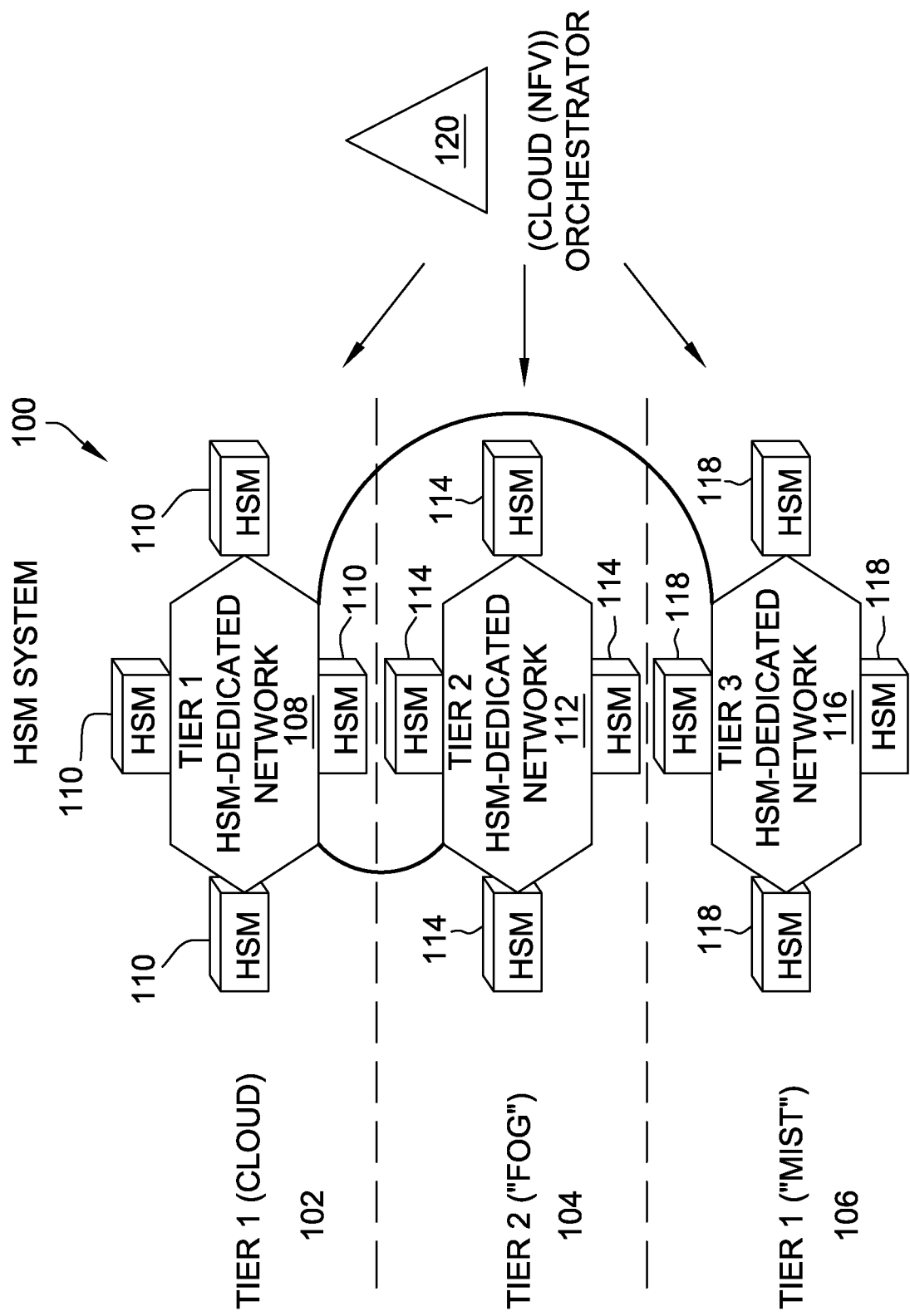
FIG. 1 is a schematic illustration of an exemplary multi-tier hardware security module network, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for establishing networks of HSMs for computer networks utilizing, for example, the Cloud and NFV environments, and more particularly for the IoT. The present embodiments introduce, among other solutions, mechanisms for enhancing the security capabilities of an HSM such that the HSM is more fully capable of implementing a PKI for the Cloud. The present embodiments are further advantageously applicable in the ETSI NFV Management and Orchestration (MANO) environment and architecture.

The embodiments herein are therefore scalable in accordance with the continually-growing complexity of the NFV, particularly with respect to the IoT context. More specifically, the present systems and methods are capable of advantageously establishing dedicated HSM networks, such that the HSM environment can be moved as close as possible to the entity utilizing the HSM network, such that bandwidth use and response time or minimized. The mechanisms described below further enable a significantly more reliable binding of credential instances to established and/or fully-attested hardware identities, and also establishment of a secure association of an HSM to the VM to which it has been assigned.

As described further below, the embodiments herein represent significant improvements with respect to: (i) HSM distribution, both across the system/network and locally, within a virtualized pod/stack; (ii) hierarchical organization of HSM networks to support various virtualization architectures, including NFV; (iii) HSM virtualization and orchestration; and (iv) key management and cryptographic functionality using a virtual distributed HSM network, including the migration of credentials and other related functionalities.

The systems and methods are of particular applicability in relation to a generic Cloud or a Cloud environment, a software-defined network (SDN), and also within the management framework of the NFV environment standardized by the ETSI NFV Industry Specification Group. The mechanisms described below may be deployed in all major Cloud carriers, and/or by network operators deploying standardized NFV. Except as where described below to the contrary, the following systems and methods may be implemented by dedicated hardware, as an all-software solution, or in hybrid hardware/software combinations.

FIG. 1 is a schematic illustration of an exemplary multi-tier hardware security module (HSM) system 100. In the exemplary embodiment, multi-tier HSM system 100 includes a first tier 102, a second tier 104, and a third tier 106. In the exemplary embodiment, first tier 102 represents the Cloud computing environment, second tier 104 represents the "Fog" computing environment (sometimes referred to as "edge computing"), and third tier 106 represents the "Mist" computing environment. In some embodiments, the Cloud includes a centralized processor, the Fog includes decentralized processing, and the Mist includes lightweight and/or local computer processing.

In an embodiment, first tier 102 includes at least one tier-1 HSM-dedicated network 108 having one or more tier-1 HSMs 110, second tier 104 includes at least one tier-2 HSM-dedicated network 112 having one or more tier-2 HSMs 114, and third tier 106 includes at least one tier-3 HSM-dedicated network 116 having one or more tier-3 HSMs 118. In the exemplary embodiment each of HSM-dedicated networks 108, 112, 116 are in operable communication with a system orchestrator 120, which may be a Cloud orchestrator or an NFV orchestrator, and may include an OpenStack Neutron Engine. In this example, Fog tier 104 and Mist tier 106 are configured such that the relevant computations are removed physically close to end-point IoT devices (not shown) operable within system 100.

In exemplary operation of system 100, significant improvements to safe networking among the several HSMs are achieved according to the exemplary system layout illustrated in FIG. 1. In the exemplary embodiment illustrated, a physically separated and high-security system network is depicted by way of example for simplicity of explanation, but is not intended to be limiting. The physically-separate, high-security embodiment is selected in FIG. 1 as an example effective storage access and establishment of command-and-control networking among Cloud orchestration and management principals. Other exemplary embodiments include, without limitation, virtual private networks having multiple layers, and implementation of the present techniques among the multiple layers thereof.

The exemplary embodiment depicted in FIG. 1 thus represents a clustering effect based on the natural geographic (or similar) relationship of modules to each other, and/or to individual IoT devices. In this example, the separated HSM-dedicated networks 108, 112, 116 are depicted among different as a specialized case tailored to a specific situation allowing cost minimization and speed maximization of the particular network of this exemplary embodiment. For example, in this instance, one or more of tier 2 HSM-dedicated network 112 and tier 3 HSM-dedicated network 116 may be Local Area Networks (LANs). Nevertheless, the specific hardware architecture of the present systems and methods is not limited to this particular multi-tier specialized network structure to enable the credential migration among different modules.

For example, in an alternative embodiment, a particular HSM-dedicated network may include and utilize a smaller segregated subset of HSMs within a single HSM-dedicated network. In some embodiments, such segregated subsets may be dictated by special security considerations, such as those dictated by law enforcement and/or regulatory agencies. In at least one embodiment, special security considerations may be implemented and managed according to a particular service-level agreement with a Cloud consumer.

Thus, according to the advantageous principles of HSM system 100, the present embodiments achieve, both within an individual network/tier, or across the tiers, of the multi-tier architecture: (i) improved capability for high transmission, and commensurate with the performance requirements imposed by the number of HSMs 110, 112, 116 operating within system 100, as well as the number of transactions performed within a relevant (e.g., predetermined) unit of time; (ii) protection from external interference that can cause degradation of the transmission capabilities of system 100; and (iii) protection from eavesdropping.

In some embodiments, eavesdropping protection is achieved by dedicating the respective network for use only by desired entities, operators, or devices. In other embodiments, eavesdropping protection is achieved using (i) communication protocols (e.g., IPSec, TLS, etc.) that guarantee confidentiality, integrity, and protection from replays, and (ii) the introduction of random "noise" by continuous interchanges among randomly selected pairs of individual HSMs that simulate transactions. These techniques represented particular improvements to traffic security by preventing a potential eavesdropper from determining an actual credential distribution of system 100 by analyzing the traffic therein. In at least one embodiment, the amount of random noise introduced is predetermined, such that the generated noise is in compliance with performance requirements of system 100 when the performance requirements are being established. In other embodiments, the amount of noise can be dynamically adjusted according to changing performance requirements in real-time, or to scale system 100 to increasing need. In one embodiment, eavesdropping protection is achieved through the alternative, or supplemental, utilization of full-time dedicated encryption techniques.

That is, because the respective HSMs establish tamper-resistant or tamper-proof platforms, HSMs 110, 114, 118 may advantageously store the related PKI keys to implement within the HSM platform itself, the physically-separate and high-security network example depicted in FIG. 1. According to this improved architecture, dedicated point-to-point encrypted connections may be established between HSMs, as a layer 1 link, using the keys stored within the respective HSM. In an exemplary embodiment, each such established connection between HSMs uses unique keys or at least one unique keypair. The relatively tamper-proof nature of the respective HSMs is thus sufficient to ensure that any unauthorized effort to access the keys or related links will trigger the relevant tamper-resistant mechanism(s) of the HSM. Through this improved system architecture, system 100 advantageously realizes the same security for the entirety of the networked HSMs 110, 114, 118 as would be realized for an individual HSM.

According to an exemplary embodiment, system 100 is advantageously capable of successfully enabling the migration of credentials associated with a particular VM such that the migrated credentials reside in the HSMs/modules that are optimal for access from the particular VMs as the VMs themselves are migrated. That is, in system 100, credentials are optimally migrated between modules within a particular HSM network, among modules in different networks in the same tier, and/or between modules of networks in different tiers.

The present migration techniques are therefore further advantageously capable of being implemented as an alternative to, or in a complementary manner with, out-of-band, that is, "manual," migration of credentials. In an exemplary embodiment, migration is managed and/or performed by system orchestrator 120, which is the entity tasked with making the relevant decisions and directing the VM placement. In some embodiments, system orchestrator 120 is further configured to include and implement specific algorithms that further enable the migration of credentials among modules. As described further below with respect to FIGS. 2 and 3, the credential migration may be performed of synchronously and asynchronously with the migration of the virtual machines themselves.

Figure 2:
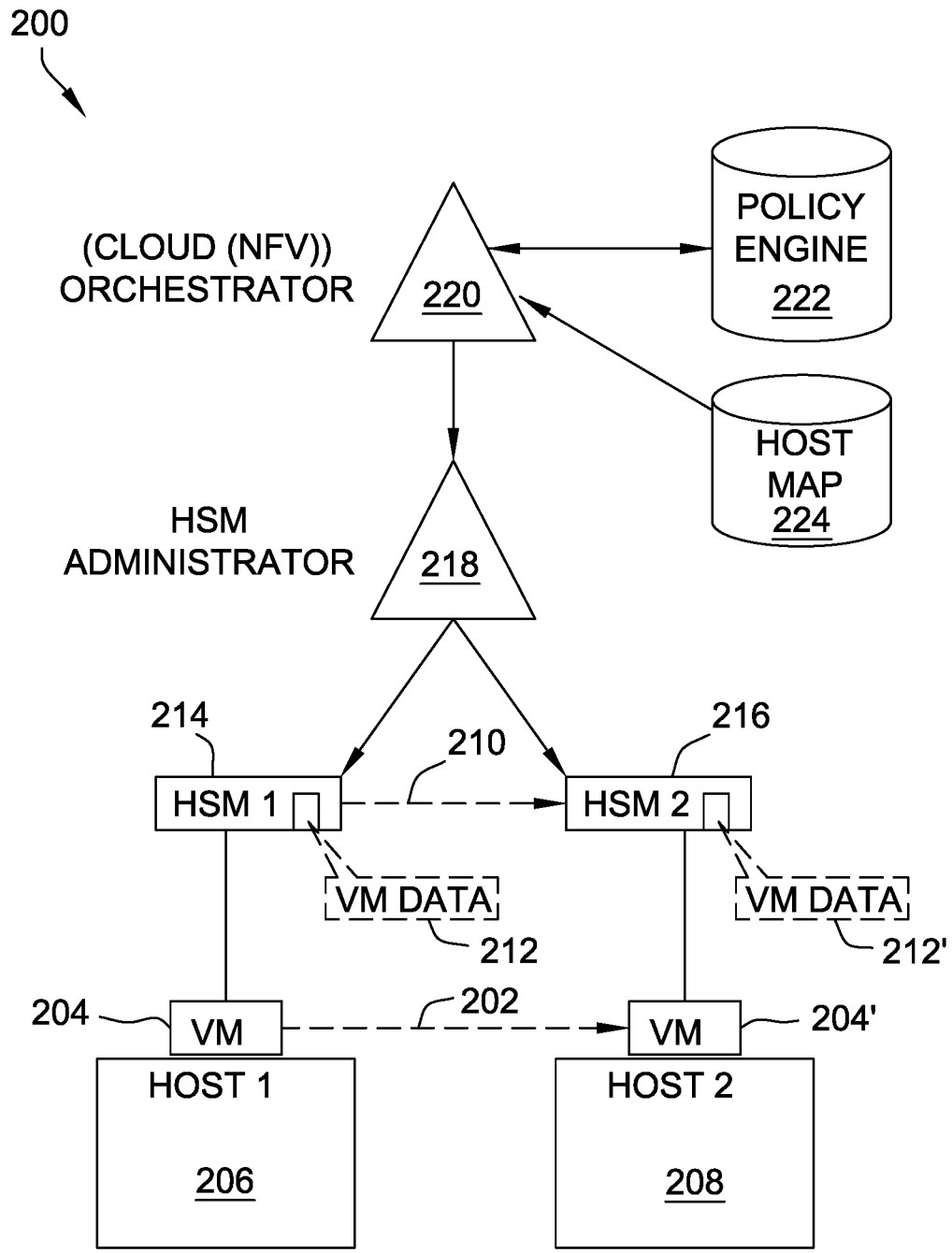
FIG. 2 is a schematic illustration of an exemplary hardware security module network for a synchronous transfer of credentials, in accordance with an embodiment.

FIG. 2 is a schematic illustration of an exemplary HSM network 200 for a synchronous transfer of credentials. In the example depicted in FIG. 2, HSM network 200 implements a migration operation 202 of a VM 204 from a first host 206 to a second host 208, and a transfer operation 210 of VM data 212 from a first HSM 214 to a second HSM 216. In an exemplary embodiment, transfer operation 210 is performed in coordination with an HSM administrator 218 and a system orchestrator 220 in operable communication with HSM administrator 218. In some embodiments, system orchestrator 220 is a Cloud or NFV orchestrator, and is further in operable communication with a policy engine 220 and a host map 224.

In exemplary operation of network 200, transfer operation 210 is performed synchronously with migration operation 202. That is, the synchronous transfer of VM data 212 (i.e., HSM data belonging to VM 204) from first HSM 214 to second HSM 216 is initiated synchronously with the decision of system orchestrator 220 to migrate VM 204 from first host 206 to second host 208. In this example, it is assumed that system orchestrator 220 is aware of a first association 226 of VM 204 with first HSM 214. In some embodiments, system orchestrator 220 is not aware of first association 226, however, in such instances, network 200 will include some element or functionality of an operating system (not shown) to keep track of such associations. Accordingly, network 200 would operate similarly in such instances, except with the inclusion of an additional communication step between system orchestrator 220 and the operating system.

In further operation of network 200, upon initiation of migration operation 202 of the VM 204 from first host 206 to second host 208, system orchestrator 220 makes a decision to synchronously transfer VM data 212 (e.g., secret data) associated with first HSM 214 to second HSM 216. In the exemplary embodiment, programmed algorithms of system orchestrator 220 are configured to make the relevant migration decision according to considerations including, without limitation: (i) Cloud Operator policies, such as may be instructed by policy engine 222; (ii) performance and/or security considerations that may be "hardwired" into host map 224, in order to keep associations of the VMs to the relevant host identities; and (iii) performance information that is dynamically received from a performance monitoring operations system (not shown in FIG. 2). Again, these examples are provided by way of illustration, and are not intended to be limiting.

In some embodiments, the particular trigger for synchronous transfer/migration may be different, but transfer operation 210 will be performed synchronously with migration operation 202. That is, in an exemplary operation of network 200, system orchestrator 220 may be further configured to effect synchronous transfer of credentials through start-of-transfer instructions to one or more of: (1) HSM administrator 218, which is an innovative system component that may communicate with or substitute for that operation system, and includes administrative jurisdiction over all HSMs (this example is depicted in FIG. 2); (2) separate HSM Administrators 218, such as in the case where first HSM 214 resides in a separate HSM administrative domain from second HSM 216, and each respective HSM administrative domain includes its own HSM administrator 218; (3) both first HSM 214 and second HSM 216 directly; and (4) either of first HSM 214 and second HSM 216, in the case where the respective HSM "transfer to" or "transfer from" command is supported by the particular module receiving the instruction.

According to the innovative techniques of HSM network 200, the actual transfer (e.g., transfer operation 210) of credentials (e.g., VM data 212) occurs concurrently with the migration (e.g., migration operation 202) of VM 204. In some embodiments, a copy of the secret data within first HSM 214 may be held for as long as VM 204 still operates on first host 206, and may be subsequently completely erased thereafter. In other embodiments, VM data 212 is erased from first HSM 214 upon completion of transfer operation 202.

The innovative techniques herein are also of particular use in the case of a key that is no longer trusted. In such instances the non-trusted key may be destroyed, and when the key is destroyed, the entire hierarchy in which the key interacts may also be destroyed. In some embodiments, network 200 is further configured to advise or alert participants in the hierarchy of the loss of trust, the destroyed key, and/or other actions related thereto. Such relevant actions may be performed irrespective of whether the key(s) is contained within multiple servers and/or multiple HSMs, whether virtualized or not. The destruction of the key may, for example, prevent unauthorized party from discovering the non-trusted key and using it. In some embodiments, only the encryption key is destroyed, and other data in the HSM remains. In at least one embodiment, the remaining data within a tamper-proof HSM is considered non-trusted, particularly in the event that a "destroyed" key had been replicated prior to the destruction operation.

In some embodiments, depending on the particular threat model chosen, upon destruction of one non-trusted key, an additional instruction is provided to destroy all other keys that are present on a particular HSM at the time the HSM is subject to compromise. In an embodiment, the applied threat model may be configured to respond differently according to a detected threat, and the particular needs of the network. For example, a software attack or a buffer overflow might trigger an alarm according to one model, but might lead to key destruction (and possibly key reissuing) in another model. In some cases, it may be desirable to prevent a key from being destroyed so that unretrieved data may be retrieved at a later time. In most instances, a "tamper proof" model will delete the keys upon detection of actual or attempted tampering. In the exemplary virtualized environment, each HSM is provided with its own unique key.

Figure 3:
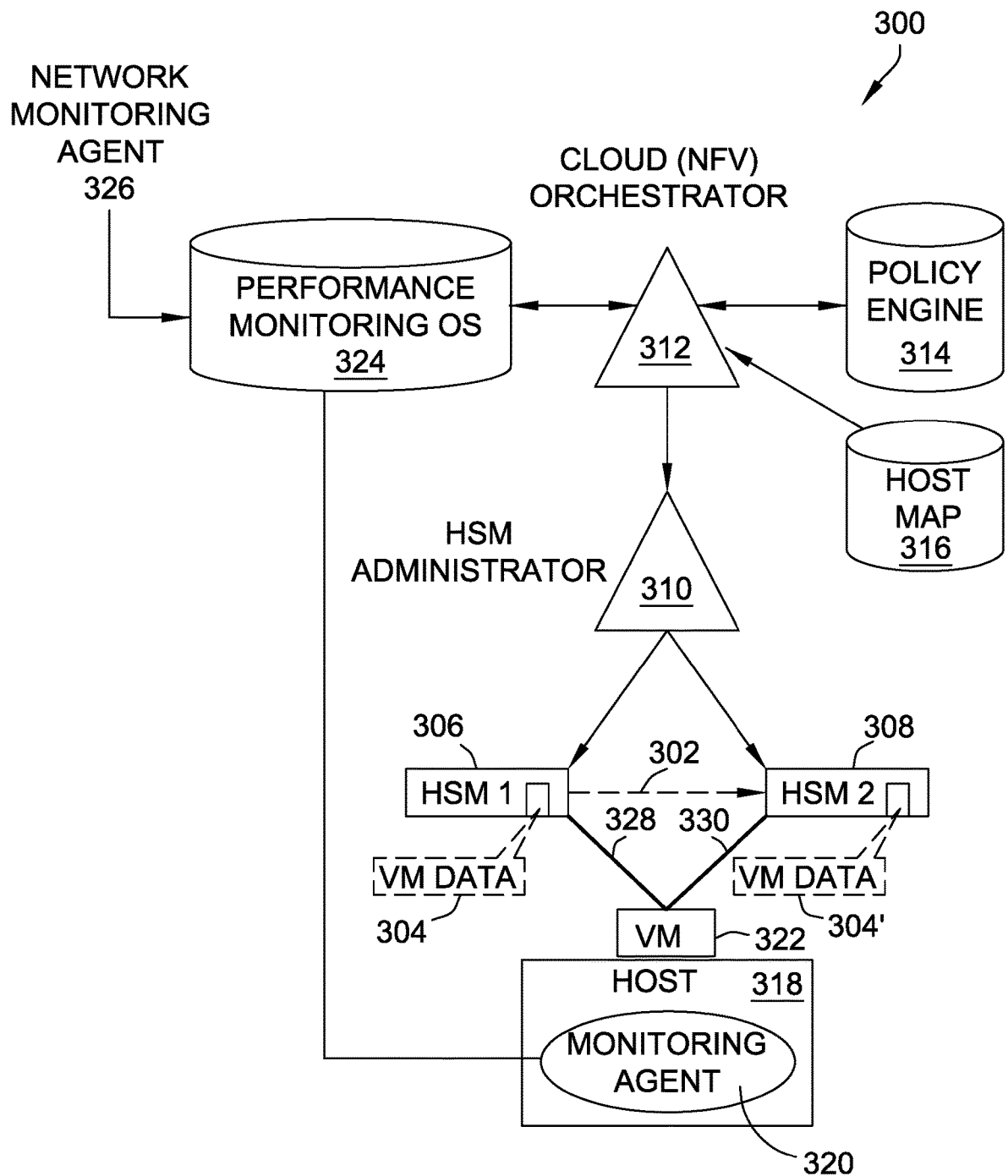
FIG. 3 is a schematic illustration of an exemplary hardware security module network for an asynchronous transfer of credentials, in accordance with an embodiment.

FIG. 3 is a schematic illustration of an exemplary HSM network 300 for an asynchronous transfer of credentials. HSM network 300 is similar to HSM network 200, FIG. 2, except that the transfer of credentials in network 300 is asynchronous. In the example depicted in FIG. 3, HSM network 300 implements a transfer operation 302 of VM data 304 from a first HSM 306 to a second HSM 308. In an exemplary embodiment, transfer operation 302 is performed in coordination with an HSM administrator 310 and a system orchestrator 312 in operable communication with HSM administrator 310. System orchestrator 312 may be further in operable communication with a policy engine 314 and a host map 316. Unless otherwise stated, elements of network 300 having the same labels may be considered to be similar in structure and function to relevant elements of network 200.

In the exemplary embodiment, network 300 further includes a host 318 having a host monitoring agent 320, and host 318 is associated with a VM 322. Host monitoring agent 320 may be in operable communication with a performance monitoring operating system 324. In some embodiments, performance monitoring operating system 324 is telemetry-based, and network 300 further includes a network monitoring agent 326.

In exemplary operation of network 200, transfer operation 302 of VM data 304 from first HSM 306 to second HSM 308 is performed asynchronously in regard to the disposition of VM 322 with respect to host 318. That is, in this example, VM 322 does not migrate to a different host, but instead, network 300 migrates the association of VM 322 from first HSM 306 to second HSM 308.

More particularly, as illustrated in FIG. 3, the transfer of VM data 304 may be triggered by the telemetry-based determinations of performance monitoring operations system 324 (e.g., an OpenStack Ceilometer measurement). In other embodiments, a trigger event may be caused by the data supplied by a performance agent at host 318, such as monitoring agent 320, which may, for example, determine a low CPU utilization of VM 322 due to an amount of time spent communicating with first HSM 306 (e.g., a measured above a threshold specified in a Service Level Agreement). In another example, the triggering event may be generated by network monitoring agent 326 indicating a substantial amount of congestion on a first path 328 between VM 322 and first HSM 306. In this example, network monitoring agent 326 may further determine that a second path 330, between VM 322 and second HSM 308, indicates a substantially lower amount of congestion than is detected on first path 328.

In further operation of network 300, upon receipt or detection of the relevant triggering event, system orchestrator 312 is configured to consult policy engine 314 and host map 316 to locate the appropriate HSM (second HSM 308, in this example) and initiate transfer operation 302 in a manner similar to transfer operation 210, FIG. 2, in the synchronous case. Also similar to the embodiment depicted in FIG. 2, the embodiment depicted in FIG. 3 is provided by way of example, and not in a limiting sense. In some embodiments, the asynchronous triggering events may arise from other sources, such as by a direct request from the Cloud consumer, from VM 322 itself, from a different operations system (e.g., a relevant security monitoring system, not shown), or by an entity other than system orchestrator 312.

Figure 4:
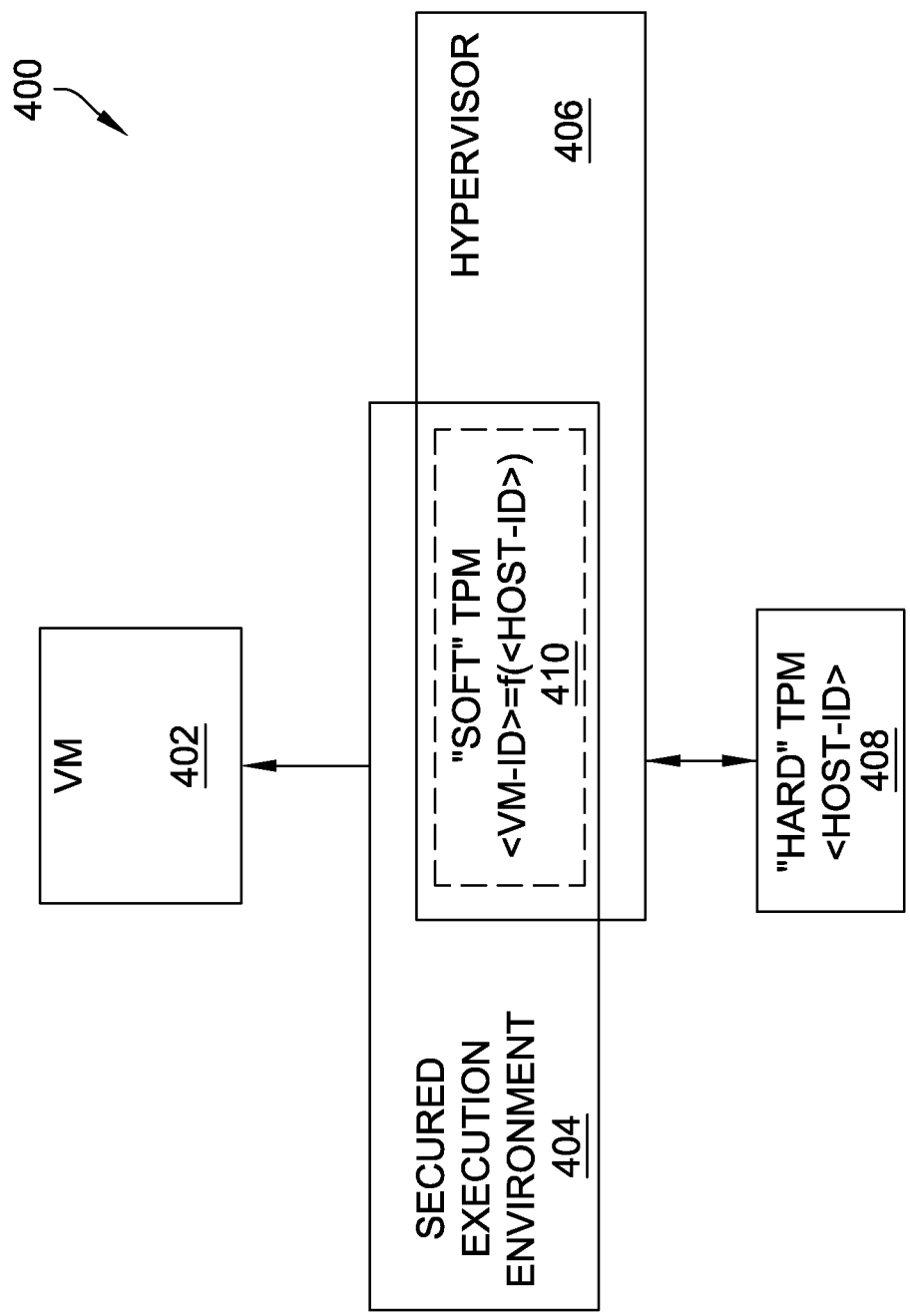
FIG. 4 is a schematic illustration of an exemplary "soft" trusted platform module architecture, in accordance with an embodiment.

FIG. 4 is a schematic illustration of an exemplary "soft" trusted platform module (TPM) architecture 400. TPM architecture 400 is structured with respect to a VM 402, a secured execution environment 404, a hypervisor 406, and a "hard" TPM 408. As illustrated in FIG. 4, soft TPM 410 is generated within overlapping portions of secured execution environment 404 and hypervisor 406.

According to exemplary embodiment depicted in FIG. 4, individual HSMs are much more reliably enabled to authenticate VM 402. Related applications describe techniques by which a system of Host-IDs may be maintained such that each Host-ID is bound to a particular physical machine at a specific location. Each Host-ID is associated with the TPM of the host, and thereby, a VM running on that host may be partially authenticated (i.e., bound to an authenticated host) by the TPM. Techniques utilizing TPM architecture 400 improve upon these related techniques by further identifying and authenticating the VM (e.g., VM 402) using the Host-ID of a virtual TPM (vTPM), or a similar mechanism.

In the exemplary embodiments depicted in FIG. 4, hypervisor 406, as part of its service to the relevant operating system (not shown), simulates a hardware platform by creating a data object that behaves, on respective operating system calls, as a TPM. In this example, standard keys may also be created and stored in the relevant structure of the created data object. This relevant structure further provides the "host identifier" (Host-ID) for VM 402, which functions to: (i) identify VM 402 both uniquely and permanently, which may be done by the system orchestrator when VM 402 is created; or (ii) only uniquely identifies VM 402 (the illustrative example depicted in FIG. 4), but in a way that ties VM 402 to the hardware host, such as by providing a soft VM-ID that is a function of the hardware Host-ID and the local VM-ID. In one example, this function may represent a return of the concatenation Host-ID|VM-ID of the Host-ID and a string assigned to VM 402 by hypervisor 406. In some such instances, for security purposes a cryptographic function may be implemented instead to more securely prevent an operator's Host-ID from being divulged.

In an embodiment, secured execution environment may be a secure enclave (e.g., provided by an Intel SGX for creating such objects), and functions to significantly improve the security of soft TMP 410 such that soft TPM 410 is effectively identical to the security level provided by hard TPM 408. In some embodiments, the public key(s) (not shown in FIG. 4) of VM 402 may be trusted by the relevant Cloud Identity Manager (e.g., OpenStack Keystone, not shown in FIG. 4). Such trust performance may be achieved using ephemeral or more permanent certificates created by hypervisor 406 and signed by the TPM EC, or by handing the keys from the system orchestrator (Cloud Orchestrator in this example) to the Cloud Identity Manager. Other mechanisms and/or sub-processes may be implemented to establish trust, but without limiting the innovative capability of architecture 400 to authenticate VM 402 using the unique VM-ID, thereby more securely enabling of the authentication of a VM to an HSM assigned to the particular VM.

In some embodiments, it is particularly desirable to perform mutual authentication in order to establish a security association between a VM and the HSM assigned to the VM. Typically, the HSM is authenticated by the VM, using the public key of the HSM. According to the present embodiments though, the reverse authentication is advantageously enabled. In accordance with the present embodiments, the credentials of the VM may be established such that the VM is authenticated by the HSM. In the exemplary embodiment of architecture 400, the HSM is able to authenticate VM 402 using the public key associated with soft TPM 410 or provisioned with the HSM.

In an alternative embodiment, a mechanism is provided that requires no additional provisioning steps for the HSM, other than what is necessary to establish trust with, for example, the Cloud Identity Manager (which already oversees other authentication and authorization transactions in the Cloud and in environments such as OpenStack). This alternative embodiment is of particular usefulness in that it eliminates particular provisioning and certification requirements, while also combining authentication process with the authorization process. This alternative embodiment further advantageously enables dynamic authentication, and of many different authentication types, including without limitation multi-factor authentication. Such dynamic capabilities allow systems and methods according to the present techniques to change at any time according to particular policies of, for example, the Cloud Operator. These advantageous techniques are further able to incorporate standards protocols, such as OAuth and its variants, as described below with respect to FIG. 5, which may include software implementations, including without limitation open source projects.

Figure 5:
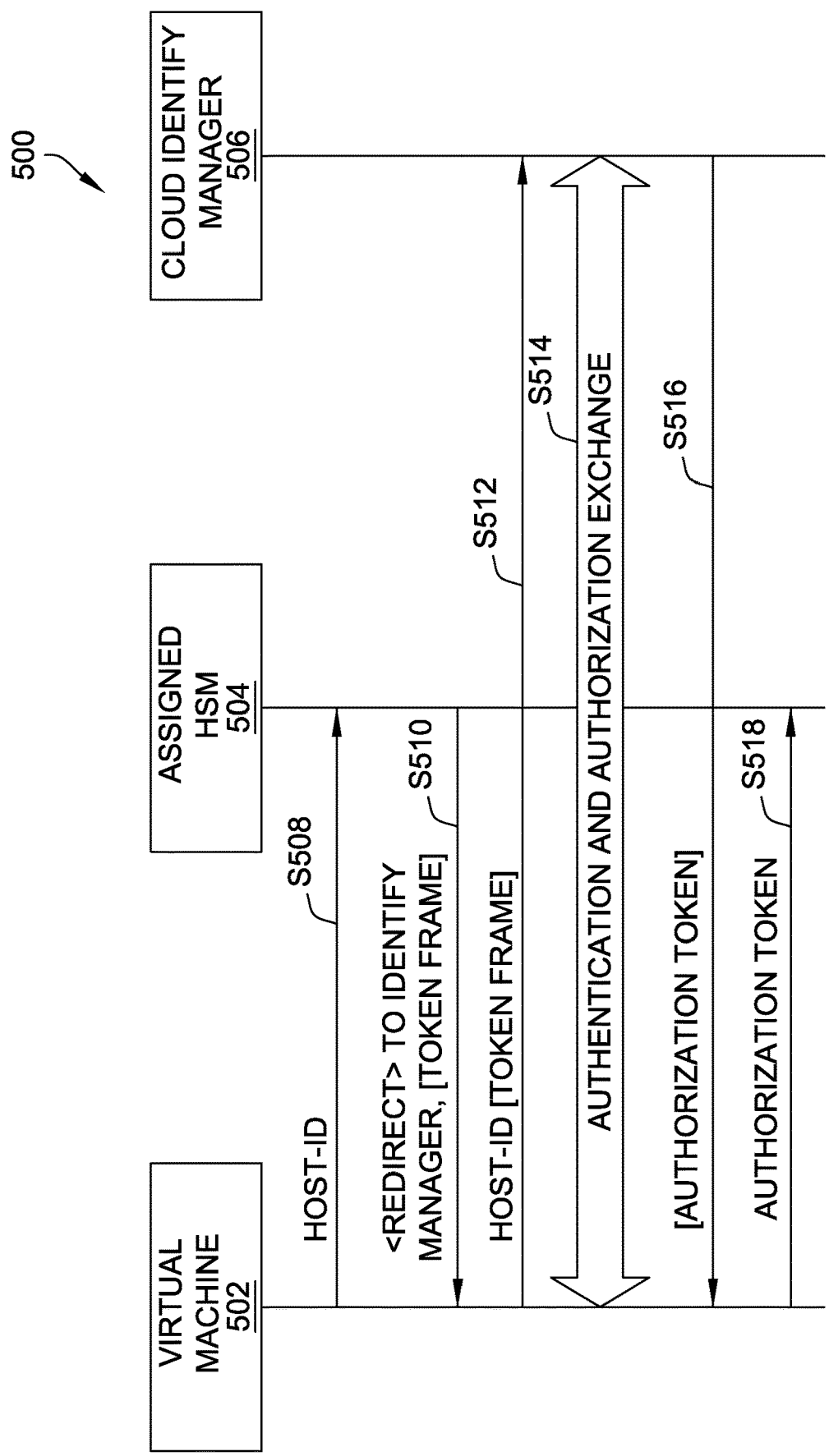
FIG. 5 is a sequence diagram for an exemplary authentication and authorization process for a Cloud identity management, in accordance with an embodiment.

FIG. 5 is a sequence diagram for an exemplary authentication and authorization process 500 for a Cloud identity management, which may be implemented with respect to one or more of the embodiments described herein. In an exemplary embodiment, process 500 includes a VM 502, an assigned HSM 504, and a Cloud Identity Manager 506, and operates to establish a secure association with HSM 504. When implemented, process 500 may execute the following steps, which are not necessarily required to be in the order listed, except where designated as being dependent on a prior step.

In step S508, VM 502 presents its identity, namely, its Host-ID, to HSM 504. In step S510, HSM 504 performs a redirect operation to VM 502. In an exemplary embodiment of step S510, in order to authenticate VM 502 and ascertain whether VM 502 is authorized to use HSM 504, HSM 504 is configured to construct a frame for an authorization token, and then attach the constructed frame to the redirect response to VM 502 (e.g., by known HTTP redirect processes). In step S512, VM 502 transmits the Host-ID, along with the constructed frame and authorization token from HSM 504, to Cloud Identity Manager 506. That is, in step S512, VM 502 presents itself and passes the token/frame to Cloud Identity Manager 506, at which point process 500 proceeds to step S514, in which the exchange of authentication and authorization between VM 502 and Cloud Identity Manager 506 begins.

In step S516, upon confirmation of authorization in step S514, Cloud Identity Manager 506 signs the authorization token and returns the token to VM 502. In an exemplary embodiment of step S516, Cloud Identity Manager 506 fails in the authorization token frame with specific information (e.g., the start and expiration time of the token) before signing the token and returning the token to VM 502. In at least one embodiment of step S516, in the case where a Cloud Operator charges for access to HSM 504, process 500 is further configured to initiate the charging mechanism at the time of transmittal of the signed token from Cloud Identity Manager 506 to VM 502. In step S518, VM 502 completes the authentication process by returning the signed token to HSM 504. In an exemplary embodiment of step S518, upon completing the authentication process, Cloud Identity Manager 506 may be further configured to check the authorization of VM 502 (e.g., based on its Host-ID) by consulting a database thereof, and/or by interrogating other management entities.

It should be noted that the particular authentication examples illustrated in FIG. 5 are provided for simplicity of explanation, and not in a limiting sense. For example, other authentication techniques may be implemented without deviating from the innovative principles of process 500, or combination of a plurality of different authentication techniques may be employed, including techniques based on symmetric keys such as Kerberos protocol, which is conventionally used in a number of known operating systems.

The several embodiments described above are of further significance from the client perspective. A network architecture used by clients to access a local HSM instance should be, ideally, both secure and distinct. As described above, most conventional Cloud implementations are known to create clusters, or pods, of servers that support virtualized instances. These clusters/pods are often networked together using switches or routers with dedicated subnets or virtual LANs (VLANs) for various functions (e.g., client level communications, management communications, etc.). As described further below with respect to FIG. 6, an improved client access network is created by the inclusion of a dedicated and/or encrypted HSM subnet (or VLAN) to provide a more secure, high performance resource for a local access HSM, such as for key management services and high performance cryptographic functionality.

Figure 6:
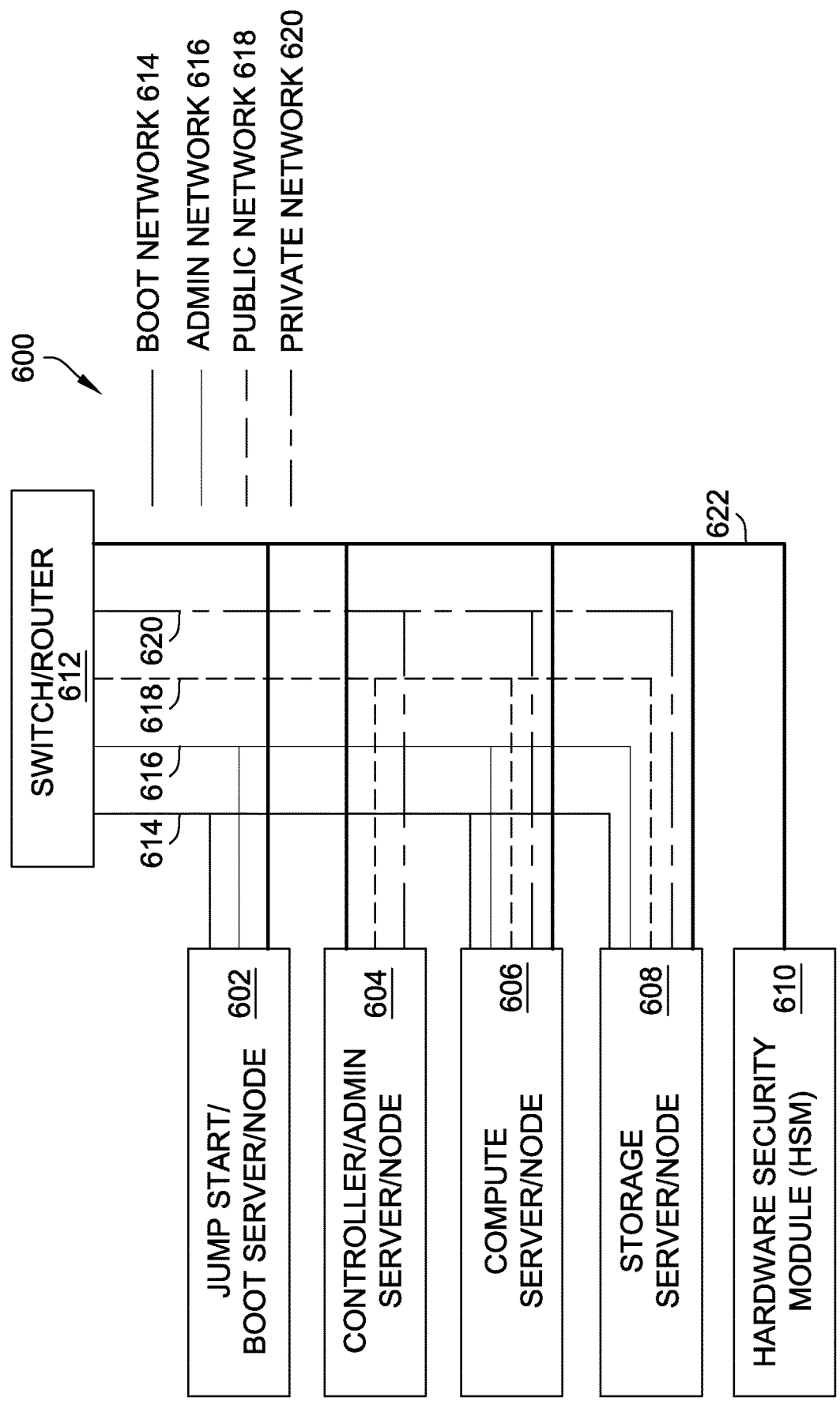
FIG. 6 is a schematic illustration of a dedicated local hardware security module access network, in accordance with an embodiment.

FIG. 6 is a schematic illustration of a dedicated local HSM access network 600. In an exemplary embodiment, access network 600 includes a jumpstart or boot server/node 602, a controller or administrator server/node 604, one or more computing servers/nodes 606, one or more storage servers/nodes 608, and at least one HSM 610. In the exemplary embodiment, access network 600 further includes a switch or router 612 configured to manage access to a segregated boot network 614, a segregated administration network 616, a segregated public network 618, a segregated private (e.g., tenant) network 620, and a dedicated subnet 622. Access network 600 may be implemented in a hierarchical organization of HSM networks to support various virtualization architectures, including NFV.

More particularly, in an exemplary embodiment of FIG. 6, an NFV infrastructure is implemented using clusters/pods of servers 602, 604, 606, 608. In exemplary operation of access network 600, the respective servers are interconnected through one or more of the several segregated networks 614, 616, 618, 620, which are organized according to respective function desired of the particular segregated network (e.g., boot, administration, public, and private). Access network 600 improves upon the conventional access network paradigm by adding cryptographic security functions and key protection through the addition of HSM 610 and dedicated subnet 622 to overlay the architecture of access network 600. Whereas conventional client access networks achieve security and key protection by leveraging segregated administration network 616 or segregated public network 618, enhanced security and performance are achieved in access network 600 through dedication of a specific security network (i.e., dedicated subnet 622) to support connectivity of HSM 610 to the various servers 602, 604, 606, 608 implementing the NFV infrastructure.

In this example illustrated in FIG. 6, HSM 610 is depicted to connect only through dedicated subnet 622. Computing servers 606, storage servers 608, and switch/router 612 though, are depicted to connect with each of the several segregated networks 614, 616, 618, 620, as well as dedicated subnet 622. Apart from dedicated subnet 622, however, boot server 602 is depicted to only connect with segregated boot network 614 and segregated administrative network 616, and administrative server 604 is depicted to only connect with segregated public network 618 and segregated private network 620.

In some embodiments, dedicated access network 600 may be further enhanced by implementing a plurality of HSMs 610 in a distributed architecture (such as an HSM cloud, described above with respect to FIG. 1), which will enable support of multiple clusters or pods. Furthermore, the exemplary embodiment depicted in FIG. 6 illustrates just one example of a physical implementation of a virtualized network infrastructure. The present inventors envision alternative infrastructure implementations, for example, that implemented by Red Hat to execute an Openstack architecture, that do not departing from the scope of the embodiments described herein. Some of the embodiments described above may implement security features onto the architectures thereof using TPMs, however, in some applications, greater degrees of flexibility may be desired than what can be achieved according to the TPM-based architecture. That is, greater flexibility may be desired to support persistent identity of software modules across different servers in a more secure manner.

According to the advantageous embodiments described herein, the present systems and methods are capable of dynamically addressing the threat level to an HSM both individually, and across multiple tiers and subnetworks of a networked computer system. The threat response may thus be optimally tailored (e.g., tamper proof, tamper resistant, and/or tamper aware) across the system according to the threat level encountered.

The present embodiments are described herein with respect to HSMs, but the person of ordinary skill in the art will understand, after reading and comprehending the present application, that the principles of the present embodiments are additionally applicable to trusted security modules that provide hardware protection of keys in a computer system. The present techniques provide innovative mechanisms for, once a key is placed in a trusted location, creating a network using that trusted key for other devices across the overall infrastructure, such that the other devices are subject to a level of protection substantially equal to the security provided by the original trusted key. This advantageous principle applies to software-based security mechanisms, in addition to hardware-based security modules.

By utilizing a unique key for each HSM, the need to create additional ephemeral keys is avoided, and in the event of a compromise, the single key advantageously allows an easier reverse determination of the impact from the compromise. Accordingly, multiple keys associated with separate modules may be used together, but where each module/unique key has a different functional purpose, thereby containing the risk across the infrastructure. If a particular HSM is determined to be compromised, other HSMs across the infrastructure may be subject to certificate renewal, either by request or automatically.

Exemplary embodiments of systems and methods for HSM credential transfer and VM migration, as well as authentication, attestation, and trust establishment in a computer network environment and for a client access network, are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of transferring security data from a non-virtual first hardware security module (HSM) of a computer network to a non-virtual second HSM, comprising the steps of:
   determining an association of a virtual machine (VM) with the first HSM, wherein the VM (i) is different from the first HSM and the security data within the first HSM, and (ii) runs on a first host within the computer network;
   triggering a migration operation of the VM at the first host;
   transferring the security data from the first HSM to the second HSM;
   initiating the migration operation of the VM from the first host to a second host different from the first host;
   synchronizing, upon triggering of the migration operation, the transfer of the security data from the first HSM to the second HSM to occur concurrently with the migration of the VM from the first host to the second host; and
   updating a status of the VM from the migration operation, wherein the transferred security data includes stored secret credentials belonging to the VM.

2. The method of claim 1, wherein the second host resides within the computer network.

3. The method of claim 1, wherein the second host resides outside of computing environment of the computer network.

4. The method of claim 1, further comprising a step of erasing the security data from the first HSM upon completion of the step of transferring.

5. The method of claim 1, wherein the migration operation comprises a step of migrating the association of the VM from the first HSM to an association of the VM with the second HSM.

6. The method of claim 1, wherein the step of triggering comprises a step of transmitting a "transfer to" command, by a system operator of the computer network, to at least one of (i) an HSM administrator, (ii) both of the first HSM and the second HSM, and (iii) the first HSM.

7. The method of claim 6, wherein the HSM administrator is configured to maintain administrative jurisdiction over the first HSM and the second HSM.

8. The method of claim 1, wherein the computer network comprises one of a Cloud computing environment and a network function virtualization computing environment.

9. The method of claim 1, wherein the computer network comprises a single tier of a multi-tier computer system.

10. The method of claim 9, wherein the single tier comprises one of a Cloud computing environment, a Fog computing environment, and a Mist computing environment.

11. The method of claim 6, wherein the step of triggering further comprises a step of instructing the second HSM with a "transfer from" command.

12. The method of claim 1, wherein the first and second HSMs include tamper resistant hardware platforms configured to store first and second keys, respectively, protected by tamper resistant mechanisms.

13. The method of claim 12, wherein the step of transferring occurs over a dedicated point-to-point encrypted connection between the first HSM and the second HSM.

14. The method of claim 13, wherein the dedicated point-to-point encrypted connection includes a layer1 link.

* * * * *